United States Patent [19]

Yuda et al.

[11] Patent Number: 5,525,196
[45] Date of Patent: Jun. 11, 1996

[54] PROCESS FOR PRODUCING FORMED ACTIVATED COKE

[75] Inventors: Toshihisa Yuda; Masahiro Matsuoka; Kazuhiko Hanashita; Fumiaki Furusawa, all of Fukuoka-ken; Mitsuhiro Takada, Tokyo, all of Japan

[73] Assignee: Mitsui Mining Co., Ltd., Tokyo, Japan

[21] Appl. No.: 261,251

[22] Filed: Jun. 14, 1994

Related U.S. Application Data

[63] Continuation of Ser. No. 958,726, Oct. 9, 1992, abandoned.

[30] Foreign Application Priority Data

Oct. 21, 1991 [JP] Japan ................................ 3-299551
Oct. 5, 1992 [JP] Japan ................................ 4-266302

[51] Int. Cl.[6] ................................................. C10B 47/20
[52] U.S. Cl. .......................... 201/32; 201/34; 201/38; 201/42; 502/430; 502/432; 432/102; 432/171; 432/207
[58] Field of Search ................................ 201/32, 34, 38, 201/42; 202/108, 121, 113, 114; 502/430, 432; 432/95, 102, 171, 207

[56] References Cited

U.S. PATENT DOCUMENTS

| | | | |
|---|---|---|---|
| 1,824,282 | 9/1931 | Loughrey | 201/34 |
| 1,826,209 | 10/1931 | Godel | 202/121 |
| 2,339,742 | 1/1944 | Fuchs | 201/38 |
| 3,316,155 | 4/1967 | Holowaty | 201/42 |
| 3,455,789 | 7/1969 | Landers | 201/42 |
| 3,869,350 | 3/1975 | Goossens et al. | 201/32 |
| 4,002,535 | 1/1977 | Albright | 201/42 |
| 4,251,323 | 2/1981 | Smith | 201/34 |
| 5,270,279 | 12/1993 | Shiraishi | 502/432 |

FOREIGN PATENT DOCUMENTS 62-51885  3/1987  Japan .

*Primary Examiner*—John M. Hoffmann
*Attorney, Agent, or Firm*—Fisher, Christen & Sabol

[57] ABSTRACT

An improved process for producing a formed activated coke for simultaneous desulfurization and denitrification, which includes passing a ground coal through a tubular or cylindrical carbonization retort by using a hot gas stream, to subject the coal to preliminary carbonization to obtain a semi-coke, adding a caking agent to the semi-coke and forming the mixture, subjecting the formed material to carbonization to obtain a formed coke, and transferring the formed coke from the top to the bottom of a vertical multi-tubular retort of indirect heating and cooling (cooling is optional) type that includes a distribution section, a heating section, an activation section and a cooling section (the distribution section and the cooling section are optional) arranged in this order (the distribution section is at the top), to activate the formed coke.

8 Claims, 4 Drawing Sheets

PROCESS FOR PRODUCING FORMED ACTIVATED COKE

This application is a continuation of prior U.S. application Ser. No. 07/958,726, filed Oct. 9, 1992, now abandoned.

BACKGROUND OF THE INVENTION

1. Field of the Invention

The present invention relates to an improved process for producing a formed activated coke for simultaneous desulfurization and denitrification which is useful as an adsorbent and an denitrification catalyst in a dry process for desulfurization and denitrification, as well as to a formed activated coke and a combustible gas both obtained by said process.

2. Description of the Prior Art

For reduction or removal of sulfur oxides and nitrogen oxides from various waste gases containing said oxides, there have been proposed and put into practical use a number of wet or dry processes for desulfurization and denitrification. Of these, the dry processes are advantageous in that they require no facility for waste water treatment which is complex and difficult to maintain and moreover the facility area may be small; therefore, the dry processes have drawn attention in recent years. Various adsorbents and catalysts are used in the dry processes for desulfurization and denitrification. In particular, carbonaceous adsorbents are in wide use because they are superior not only in adsorbability for sulfur oxides but also in ability as a reduction and decomposition catalyst for nitrogen oxides. As such carbonaceous adsorbents for desulfurization and denitrification, there have been used adsorbents obtained by granulating or forming raw materials composed mainly of an activated carbon. As the facilities for desulfurization and denitrification have become larger recently and a number of desulfurization and denitrification apparatuses of moving bed type or fluidized bed type have come to be adopted, the above granulated or formed activated carbons have come to create problems; that is, they have low strengths in pressure resistance, abrasion resistance, impact resistance, etc., undergo severe damage and loss during repeated use for adsorption and regeneration, and show poor economy. Various studies were made in order to eliminate the above drawbacks of activated carbon type adsorbents. As a result, there was developed a formed activated coke suitable for simultaneous desulfurization and denitrification, which is obtained by mixing a coal as primary material with various binders, etc., forming the mixture and subjecting the formed material to carbonization and activation under particular conditions (e.g. Japanese Patent Publication No. 51885/1987). The production process for this formed activated coke is greatly different from the conventional production process for activated carbon or molecular sieve carbonaceous material, which comprises forming a raw coal-binder mixture into granules, etc. and then activating the formed product. The formed activated coke is produced, for example, as follows. That is, a coal is subjected to preliminary carbonization using a carbonization retort of fluidized bed type, moving bed type or the like to obtain a semi-coke of reduced volatile matter content and high activity; this semi-coke as primary material is mixed and kneaded with secondary materials, i.e. a caking coal and a binder; the kneaded product is formed; the formed material is subjected to carbonization and activation using a rotary kiln of internal or external heating type, a vertical multi-stage retort or the like, to obtain a formed activated coke. The formed activated coke obtained, unlike the conventional activated carbon, has a uniform shape and a high strength enabling the circulation use in a reactor chamber of moving bed type. Moreover, the formed activated coke has particular pore sizes and a particular pore size distribution because it is obtained by grinding a semi-coke obtained by carbonization, forming the ground semi-coke together with a caking agent and subjecting the formed material to recarbonization; therefore, the formed activated coke can be used in simultaneous desulfurization and denitrification. The above production process for formed activated coke, however, has the following problems.

Production of semi-coke by preliminary carbonization of coal is ordinarily conducted using a carbonization retort of fluidized bed type or moving bed type. In using such a carbonization retort, a coal is subjected to carbonization in a fluidized state; therefore, the residence time of coal is not constant owing to the variation in particle size, etc. and moreover is relatively long (several minutes to several tens of minutes); the resulting semi-coke has a large variation in volatile matter content, causing a variation in quantity of final product (formed activated coke); further, fusion bonding of coal takes place in the fluidized bed or moving bed, which often causes clogging of retort. In order to take measures for these problems, it is necessary to strictly control the retort-inside temperature and oxygen concentration, which makes difficult employment of larger-sized fluidized bed or moving bed.

Activation treatment for formed coke is ordinarily conducted using, as an activation retort, a rotary kiln of internal or external heating type, an activation retort of fluidized bed type, a multi-stage retort of fluidized bed type, or the like. In these activation retort, however, the amount of formed coke fed is at best 20% or less of the retort-inside space; the reaction efficiency is low, making a large-sized retort necessary; the amount of formed coke treated is about 40 kg/hr per m$^3$ of the retort; a large amount of energy is required in order to maintain a desired temperature, which makes it necessary to burn part of the material fed in order to maintain the reaction temperature; the distance of transfer of formed coke in retort is long in the case of a rotary kiln or a multi-stage retort, which incurs reduction in yield owing to the physical abrasion and partial combustion of material to be treated.

Further, in the activation retort, quality control is difficult because it is difficult to make constant the residence time of formed coke.

Further, in the activation retort, the gas discharged therefrom is not utilized as a combustible gas and is wasted because one gas is used as the heating gas for activation reaction and also as an activation gas, with the result that concentrations of hydrogen and carbon monoxide in the discharged gas [hydrogen and carbon monoxide are generated mainly by a reaction ($C+H_2O \rightarrow H_2+CO$) in the activation reaction] are only about 10% or less.

A vertical retort of fluidized bed type is known as an activation retort into which a large amount of a carbonaceous material can be fed and which can give an activated carbon of uniform quality. This retort is suitable for production of granular activated carbon of small particle diameter (0.5–3.0 mm) or a powdered activated carbon; however, when the retort is used for production of a carbonaceous material of large particle diameter (5–30 mm) such as formed activated coke for desulfurization and denitrification, fluidization is difficult and reaction time is longer than that required in production of powdered carbon; thus, the retort has been difficult to put into practical use.

SUMMARY OF THE INVENTION

The object of the present invention is to solve the above-mentioned problems and provide an improved process for producing a formed activated coke for simultaneous desulfurization and denitrification which has such a high strength as to enable the circulation use in a reactive chamber of moving bed type, which has desired pore sizes and a desired pore size distribution, which has stable quality, and which has excellent abilities for desulfurization and denitrification, which process can recover combustible components (e.g. hydrogen) generated mainly in the activation reaction and can use them as a combustible gas.

The above object can be achieved by the process of the present invention, i.e. an improved process for producing a formed activated coke, comprising subjecting a coal to preliminary carbonization to obtain a semi-coke, adding, to the semi-coke as primary material, a secondary material for control of caking property to prepare a forming material, forming the forming material to prepare a formed material, subjecting the formed material to carbonization to obtain a formed coke, and activating the formed coke to obtain a formed activated coke, the improvement wherein the following step (a) and/or (b) are/is employed:

(a) a step of subjecting a coal to preliminary carbonization to obtain a semi-coke, which comprises passing a coal ground so as to have an average particle diameter of 10–1,000 μm, through a tubular or cylindrical carbonization retort kept at 200°–1,000° C. by using a hot gas stream of 200°–1,000° C. containing 1–21% of oxygen, and (b) a step of activating a formed coke, which comprises transferring a formed coke from the top to the bottom of a vertical multi-tubular retort of indirect heating type through the retort tubes, said retort comprising at least (1) a heating section containing three or more vertical tubes, for heating the formed coke to 600°–1,000° C. and (2) an activation section containing three or more vertical tubes and provided below or beneath the heating section, for contacting and activating the formed coke with an activation gas at 750°–1,000° C.

The present process may be carried out by using, in a known process for producing a formed active coke, either step (a) or (b) in place of the corresponding step of the known process or both steps (a) and (b) in place of the corresponding steps of the known process. The feature of step (a) is that coal particles are passed through a preliminary carbonization retort in a short period of time by using a reactive hot gas stream, to give rise to carbonization while, in the conventional corresponding step, coal particles are subjected to carbonization in a carbonization retort of fluidized bed type or moving bed type. The feature of step (b) is that activation is conducted using a vertical multi-tubular retort of indirect heating type while in the conventional corresponding step, activation is conducted using a rotary kiln or a vertical multi-stage bed retort. The effects of these steps are described later.

Step (b) can also be conducted using a vertical multi-tubular retort of indirect heating and cooling type which comprises, in addition to the heating section and the activation section, a cooling section containing three or more vertical tubes and provided below the activation section, for cooling the formed activated coke to about 200° C.

Step (b) can also be conducted using a vertical multi-tubular retort of indirect heating type which comprises, in addition to the heating section and the activation section, a distribution section containing three or more vertical tubes and provided above the heating section, for distributing the formed coke uniformly into the individual tubes of the heating section. In this case, activation can be conducted uniformly and smoothly.

In the vertical multi-tubular retort of the present invention, it is not necessary to provide the heating section and the activation section in separate structures and they may be constituted continuously and integrally using common vertical tubes. In this case, the boundary between the heating section and the activation section is unclear; however, since it is sufficient that the formed coke is heated to a desired temperature before the coke reaches the activation section, the zone in which the formed coke is heated to a desired temperature becomes a heating section.

In this specification, the vertical multi-tubular retort refers to a vertical multi-tubular retort of indirect heating (and cooling) type which comprises a plurality of vertical tubes inside and in which the formed coke flows down inside the tubes and the space defined by the retort wall and the the tubes functions as a passage for heating gas (a gas passage) and, optionally, also as a passage for cooling medium (a cooling medium passage).

Therefore, in the heating section, a heating gas flows through a gas passage outside the tubes; in the cooling section, a cooling medium flows through a cooling medium passage; thus, neither heating gas nor cooling medium comes in contact with the formed coke. Meanwhile in the activation section, an activation gas flows inside the tubes and makes contact with the formed coke, and the inside of each tube functions as an activation gas passage. In the distribution section, the gas, which reaches the distribution section after activation reaction, can be collected. In such a structure, the gas passage (or the cooling medium passage) in the heating section (or the cooling section) is closed at the top, and the activation gas passages in the activation section are not closed even at the top.

When the heating section and the activation section are provided in a continuous integral structure, the heating gas and the activation gas can be combined and fed as a single gas, i.e. a heating and activation gas. In this case, the gas passage of the heating section (i.e. the outside of the heating section tubes) is connected to the outside of the activation section tubes to form a new gas passage; the lower end of the outside of the activation section tubes is made open; the heating and activation gas is introduced into the gas passage through the inlet of the activation section; part of the gas flows into the activation section tubes and becomes an activation gas; the remainder (major portion) of the gas flows through the gas passage as a heating gas and is discharged from a heating gas outlet provided at the side of the heating section. The locations of the inlet and outlet of gas can be chosen depending on the shape of the retort, the conditions of activation treatment and the like. Since a single gas is used for two purposes by separating it into a heating gas and an activation gas, the gas after activation reaction contains relatively high concentrations of hydrogen and carbon monoxide generated in said reaction and can be effectively used as a combustible gas. This gas can be collected in the distribution section.

The above technique of activating a formed coke using a vertical multi-tubular retort has not been known heretofore.

According to the present invention, in the step for semi-coke production, a semi-coke of highly uniform quality can be obtained at a high yield, making it possible to obtain a final product of stable quality, i.e. a formed activated coke of stable quality; in the activation step, use of a vertical multi-tubular retort as activation retort enables significant improvement in volume efficiency of activation step and simplification of apparatus. Further in the activation step using such a vertical multi-tubular retort, it is possible to recover combustible components such as hydrogen and carbon monoxide generated mainly in the activation reaction and reuse them as a fuel, whereby the heat efficiency of the whole process is improved significantly.

DETAILED DESCRIPTION OF THE PREFERRED EMBODIMENTS

Figure 1:
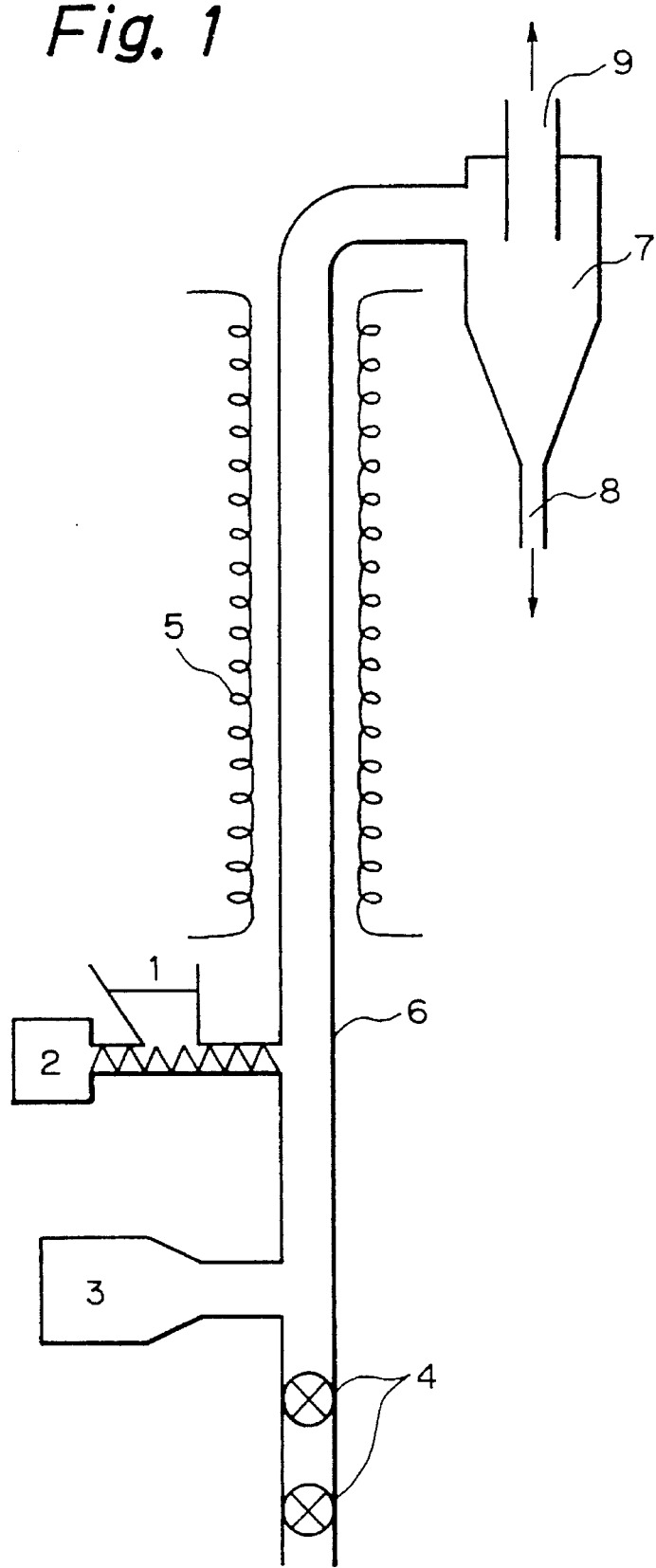
FIG. 1 is a schematic vertical sectional view showing an example of the preliminary carbonization retort used in the present invention.

In the present process, the coal used as a raw material for semi-coke is a coal belonging to sub-bituminous coal or bituminous coal. When this coal per se is mixed with a caking agent and the mixture is formed and then subjected to carbonization, there arise various problems. That is, fusion bonding tends to occur during the carbonization; uniform control of surface area is difficult; and the formed activated coke as final product has low strength and insufficient abilities for desulfurization and denitrification. Hence, in step (a), a coal is first ground so as to have an average particle diameter of 10–1,000 μm, preferably 50–200 μm and then subjected to preliminary carbonization by passing through a tubular or cylindrical carbonization retort maintained at 200°–1,000° C. using a hot gas stream of 200°–1,000° C., preferably 400°–850° C. containing 1–21%, preferably 5–15% of oxygen, to obtain a semi-coke containing about 10–30% of a volatile matter. The heat gas stream contains $N_2$, $CO_2$, etc. besides oxygen; however, these components other than oxygen have small effects on preliminary carbonization. The sectional area of carbonization retort, the length of heating section of retort and the amount of hot gas stream fed into retort are appropriately determined depending upon the properties and particle size of raw material coal, the heating conditions or the production scale; however, it is preferable that the moving speed of coal be 2–30 m/sec and the residence time in heating section be about 1–10 seconds. In contrast, in the conventional carbonization retort of fluidized bed type or moving bed type, the residence time in heating section is several minutes to several tens of minutes; thus, the carbonization in the present process can be carried out in a very short period of time. When the coal has an average particle diameter smaller than 10 μm, the yield of coke recovered is low; when the coal has an average particle diameter larger than 1,000 μm, coal transfer is difficult and heat treatment is non-uniform. When the temperatures of heating section and hot gas stream are lower than the above ranges, carbonization is insufficient. When said temperatures are too high, control of volatile matter content may be difficult. Volatile mater content was measured according to the test method specified in JIS M 8812. In the preliminary carbonization step, the starting material coal undergoes (1) oxidation by the oxygen in hot gas stream and (2) thermal effect by the heat of said stream, whereby the volatile matter content (30–40%) in coal is reduced and the coal is converted to a semi-coke having a volatile matter content of 10–30% and a specific surface area of 10–300 $m^2/g$. In the semi-coke, the variation in volatile matter content is small and within ±10% of average volatile matter content. When the preliminary carbonization is conducted excessively, the volatile matter content in semi-coke is too low, which allows the semi-coke to have too low caking property and gives a formed activated coke of low strength, inappropriate pore size distribution and low abilities for desulfurization and denitrification. When the volatile matter content in semi-coke is too high, the formed material gives rise to swelling and fusion bonding in the carbonization step and the formed activated coke has low strength. The above preliminary carbonization makes small the variation in volatile matter content in semi-coke and resultantly the variation in quality of final product, i.e. formed activated coke (said variations are large in the conventional carbonization retort of fluidized bed type or moving bed type owing to the non-uniform residence time of coal in retort), eliminates the clogging of retort which occurs owing to the fusion bonding of coal in the fluidized bed or moving bed of the conventional retort, and makes it possible to produce a semi-coke of uniform quality at a high yield.

A preferred structure of the preliminary carbonization apparatus is shown in FIG. 1. In FIG. 1, a ground raw material coal is fed by a coal feeder 2 from a hopper 1 into a tubular carbonization retort 6 provided with rotary valves 4 at the lower end, is transferred and passed through the retort 6 by a hot gas stream fed from a hot gas furnace 3, is collected by a cyclone 7, and is discharged from a semi-coke outlet 8, The temperature inside the retort can ordinarily be maintained at a desired temperature easily with the heat given by the hot gas and the heat generated by oxidation of coal and partial combustion of carbonization product; however, since heat loss is larger than the above-mentioned heats in some cases (for example, when the amount of material to be treated is small), it is preferable to provide the retort 6 with a heating means 5 (e.g. heater) and heat the retort 6 as necessary. The hot gas separated by the cyclone is discharged outside from a hot gas outlet 9. As the means for collecting the produced semi-coke, provided at one end of the carbonization retort, a cyclone shown in FIG. 1 is preferred from structural and functional standpoints. However, other means, for example, a filter or a gravitational collector can also be used. The yield in the above apparatus is about 80–90%.

It is possible that carbonization be conducted according to a conventional method using a conventional carbonization retort of fludized bed type or moving bed type, in place of conducting step (a), and then step (b) (described later) be conducted. That is, in the present invention, it is sufficient that step (a) or (b) or steps (a) and (b) be conducted.

The thus obtained semi-coke has less caking property by itself. Hence, in order to add caking property to the semi-coke and produce a formed coke of high strength, the semi-coke as primary material is mixed with secondary materials, i.e. other coal of high caking property and a binder for forming such as coal tar pitch or the like and, as necessary, further with appropriate amounts of forming aids such as water, surfactant, organic solvent and the like; the mixture is kneaded to prepare a forming material so that the material has a caking property of 20–30% in terms of the Roga index measured in accordance with the method specified in JIS M 8801. When the Roga index of forming material is smaller than 20%, the resulting formed coke has low strength. When the Roga index is larger than 30%, the formed coke obtained from the formed material gives rise to fusion bonding. The amount of secondary materials mixed is ordinarily about 5–40% by weight based on the primary material. The forming material having desired caking property is formed into a desired shape (e.g. pellets, tablets) using an appropriate forming machine of roll press type, pelletizer type, disc pelleter type or the like. The size of the formed material can be appropriately selected depending upon the conditions in which the formed material is used, but the preferable size is ordinarily 5–30 mm.

The above-obtained formed material is subjected to carbonization to obtain a molded coke. The carbonization is conducted at 600°–1,000° C. for about 30 minutes to 3 hours in a gas (e.g. nitrogen, combustion waste gas) which may contain oxygen in an amount up to about 10%, using an ordinary carbonization apparatus, for example, a rotary kiln of internal or external heating type, whereby a formed coke having high strength and a specific surface area of 10–60 $m^2/g$ can be obtained. Incidentally, the specific surface area can be measured by the B.E.T. method.

Then, the formed coke is activated to obtain a formed activated coke having excellent abilities for desulfurization and denitrification. In this activation step, it is necessary to increase the specific surface area of formed coke without reducing its strength. In the present invention, there is employed, as the step for activating the formed coke, a step (b) which comprises transferring the formed coke from the top to the bottom of a vertical multi-tubular retort of indirect heating type through the tubes, said retort comprising at least (1) a heating section containing three or more vertical tubes, for heating the formed coke to 600°–1,000° C. and (2) an activation section containing three or more vertical tubes and provided below or beneath the heating section, for contacting and activating the heated formed coke with an activation gas at 750°–1,000° C. (coke temperature), preferably 850°–950° C.

In step (b), unlike in the conventional activation step conducted using a rotary kiln or a multi-stage bed type vertical retort, the formed coke flows through a plurality of tubes. As a result, smooth and uniform heating of formed coke and uniform contact of formed coke with activation gas become possible, and activation treatment can be conducted uniformly and efficiently.

When step (b) is conducted using a vertical multi-tubular retort of indirect heating and cooling type comprising, besides the heating section and the activation section, a cooling section containing three or more vertical tubes and provided below the activation section, for cooling the activated forming coke to about 200° C., the cooling after activation becomes uniform and the operation after activation becomes smooth.

When there is used the above retort having a heating section, an activation section and a cooling section inside, the formed coke flows down through the heating section tubes (in which the formed coke is heated to 600°–1,000° C.), the activation section tubes (in which the heated formed coke is contacted and activated with an activation gas at 750°–1,000° C., preferably 850°–950° C.) and the cooling section tubes (in which the activated formed coke is cooled to about 200° C.) in this order; a heating gas is passed through the outside of the heating section tubes, an activation gas is passed through the insides of the activation section tubes, and an appropriate cooling medium is passed through the outside of the cooling section tubes. The activation gas enters the activation section tubes through the inlet of the activation section and is discharged through the outlet of the activation section or the heating section. Thus, by using a vertical multi-tubular retort of indirect heating and cooling type in which a plurality of tubes are arranged vertically and in parallel, in which a formed coke flows down through the inside of each tube, and in which a heating gas or a cooling medium passes through the outside of each tube, smooth and uniform heating and cooling become possible and uniform contact of formed coke with activation gas becomes also possible.

The residence time of formed coke in heating section is about 10–60 minutes, the residence time in activation section is about 10–180 minutes, and the residence time in cooling section is about 10–60 minutes. The activation conditions may be appropriately determined depending upon the properties of formed coke used, the kind and temperature of activation gas used, etc. However, it is preferable that the activation conditions be determined so that the formed activated coke obtained has a specific surface area suitable for simultaneous desulfurization and denitrification, i.e. 100–300 $m^2/g$. When the activation conditions are too mild, it is impossible to obtain a sufficiently large specific surface area. When the activation conditions are too severe, the formed activated coke has low strength.

As the heating gas, there is preferably used a gas obtained by combustion of COG, LNG, fuel oil or the like. As the cooling medium, there can be used water, air, steam or the like. In the present process, there is used, as the activation gas, a gas suitable for steam activation, i.e. a non-oxidizing gas containing 10–50% of water. The activation gas is preferably a high-temperature gas obtained by combustion of a high-hydrogen-content fuel such as COG, LPG, LNG or the like, and it is used after temperature adjustment with an activation waste gas or the like and water content adjustment by addition of steam or water.

The amounts of heating gas and cooling gas fed are such that the heating section and the cooling section can maintain respective desired temperatures. The amount of activation gas fed into activation section differs by the kind of formed coke used, the activation conditions (e.g. reaction temperature, contact time) and the desired properties of formed activated coke to be obtained, but is preferably 100–1,000 times (in volume) that of formed coke fed.

When there is used a vertical multi-tubular retort of indirect heating type wherein the heating section and the activation section have a continuous structure and the tubes of these sections are continuous and common, the outside of the heating section tubes and the outside of the activation section tubes are continuous and function as a gas passage, and the top of the continuous outside is closed and its bottom is open. A heating and activation gas is fed into the gas passage at the side of the activation section, whereby part of said gas enters the insides of the activation section tubes (the passages of formed coke) via the lower end of the gas passage and becomes an activation gas while the remainder of said gas flows through the gas passage and heats the heating section as a heating gas. In this case, the heating and activation gas may be the same as the above-mentioned activation gas. The proportions of the heating gas and the activation gas after separation of the heating and activation gas are such that the volume of the activation gas is 100–1,000 times that of the formed coke fed and the heating gas can heat the heating section up to a desired temperature, and generally, the volume ratio of heating gas/activation gas is approximately 5 to 100 although it may vary depending upon the activation conditions employed.

Figure 2A:
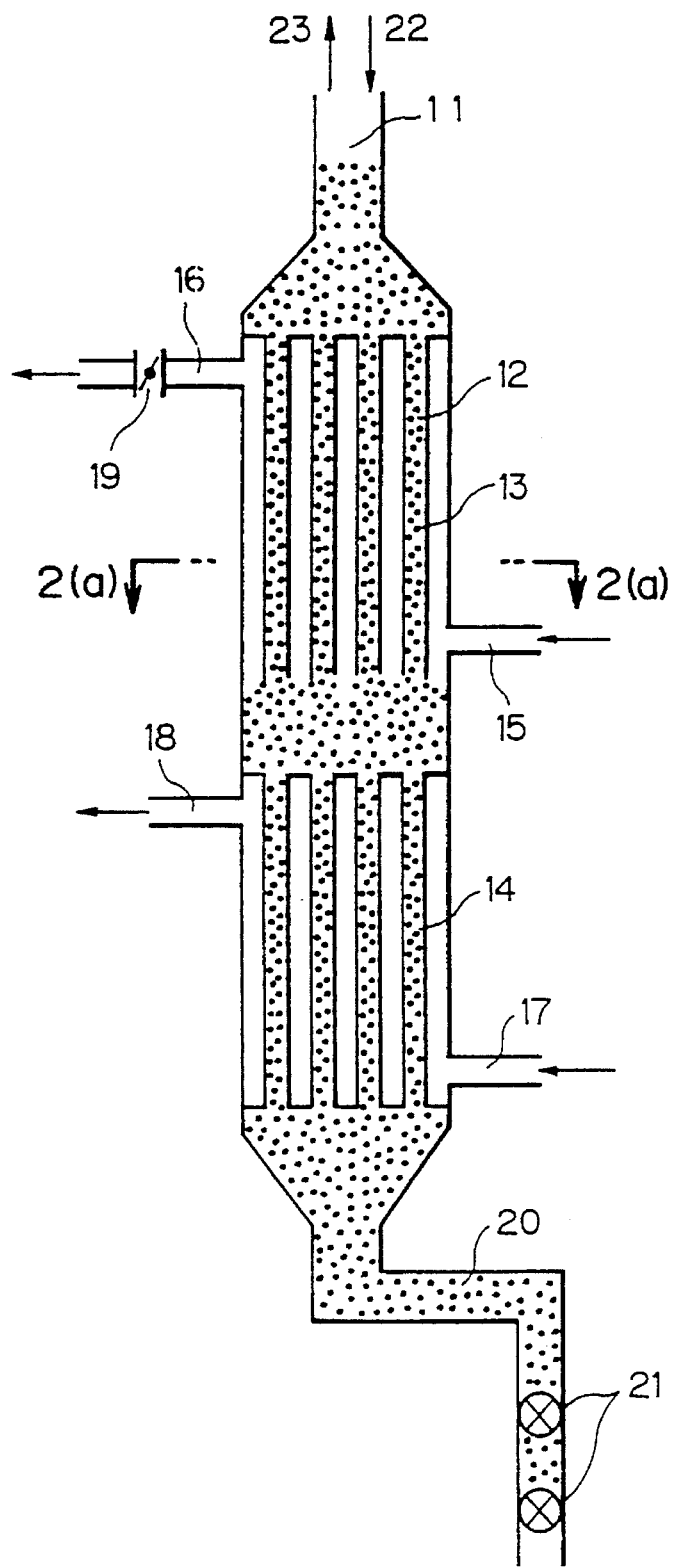
FIG. 2(a) is a schematic vertical sectional view showing an example of the vertical multi-tubular retort used in the present invention.

FIG. 2 shows a preferred example of the vertical multi-tubular retort usable in the present process. The retort of this example has a heating section, an activation section and a cooling section, wherein the heating section and the activation section have a continuous structure. In FIG. 2(a), a formed coke obtained in the preceding carbonization step, is fed into a vertical multi-tubular retort from a carbonaceous material inlet 11 at the top of the retort, as shown in an arrow mark 22. The formed coke passes through a heating section 12 and is heated, and then is activated, in an activation section 13, with an activation gas fed from the bottom of the activation section. This activation gas, which is part of a heating and activation gas fed from a heating and activation gas inlet 15, rises inside the activation section tubes and the heating section tubes and is discharged from a formed coke inlet 11 as shown in an arrow mark 23. This gas contains large amounts of combustible components and is reusable as a fuel (the means for collecting this gas is described later in connection with a distribution section). The remainder of the heating and activation gas passes through the outside of the activation and heating section tubes, is used for heating of formed coke, and then is discharged from a heating gas outlet 16. Of the heating and activation gas fed, the proportion of gas introduced into activation section can be appropriately controlled by a gas flow controller 19 (e.g. damper) provided at the heating gas outlet.

The formed activated coke which has been activated in the activation section, passes through a cooling section 14 in 10–60 minutes (residence time) and is indirectly cooled with a cooling medium (e.g. air) fed from a cooling medium inlet 17 and discharged from a cooling medium outlet 18. Thereafter, the cooled coke is discharged outside via a formed activated coke collector 20 (e.g. vibrating feeder) and a gas sealer 21 (e.g. rotary valve).

By employing the above embodiment, no independent facility for preparation and transfer of activation gas is required and a significantly simplified activation step can be used.

Figure 2B:
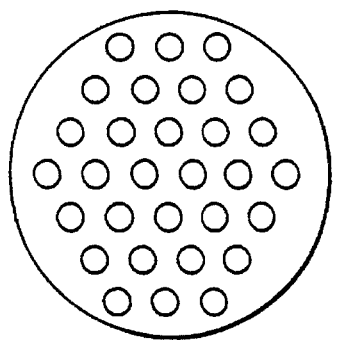
FIG. 2(b) is a schematic transverse sectional (A—A') view of the vertical multi-tubular retort shown in FIG. 2(a).

FIG. 2(b) is a schematic transverse sectional (A—A') view of the retort of FIG. 2(a). In FIG. 2(b), the cross-sections of the retort and the tubes are circular; however, their shapes are not particularly restricted and may be polygonal or donut-shaped. When the tubes are donut-shaped, i.e. hollow double cylinders, the heating gas may be passed outside the outer cylinder and through the inner cylinder.

The number of tubes is about 3–1,000 for practical purpose.

The size, number and arrangement of tubes may be different between the heating section and the activation section; however, they are preferably the same between the two sections in order to obtain a carbonaceous material of more uniform quality.

In the A—A' sectional view of FIG. 2(b), the tubes are arranged in regular triangles but may be arranged in any desired shape (e.g. square).

The formed activated coke obtained by the above-mentioned process of the present invention has a strength of 90% or more and a specific surface area of 100–300 $m^2/g$ as measured by the test methods described later in Examples, and has a sufficient strength enabling repeated use in moving bed type apparatuses for desulfurization and denitrification and excellent abilities for desulfurization and denitrification.

Next, description is made on a retort which is a further improvement of the above-mentioned retort. In this retort, a distribution section containing three or more tubes is provided above the heating section and a formed coke is distributed uniformly into said tubes, whereby the later activation can be conducted more smoothly and uniformly.

A formed coke flows down inside the distribution section tubes. The space outside the tubes is open at the bottom and is closed at the top so as to enable collection of gas rising up from below after activation reaction. The gas collected in said space is discharged outside the retort through an outlet and recovered. The recovered gas is a combustible gas containing 15–60% of combustible components (e.g. hydrogen and carbon monoxide) generated mainly in the activation reaction.

Figure 3:
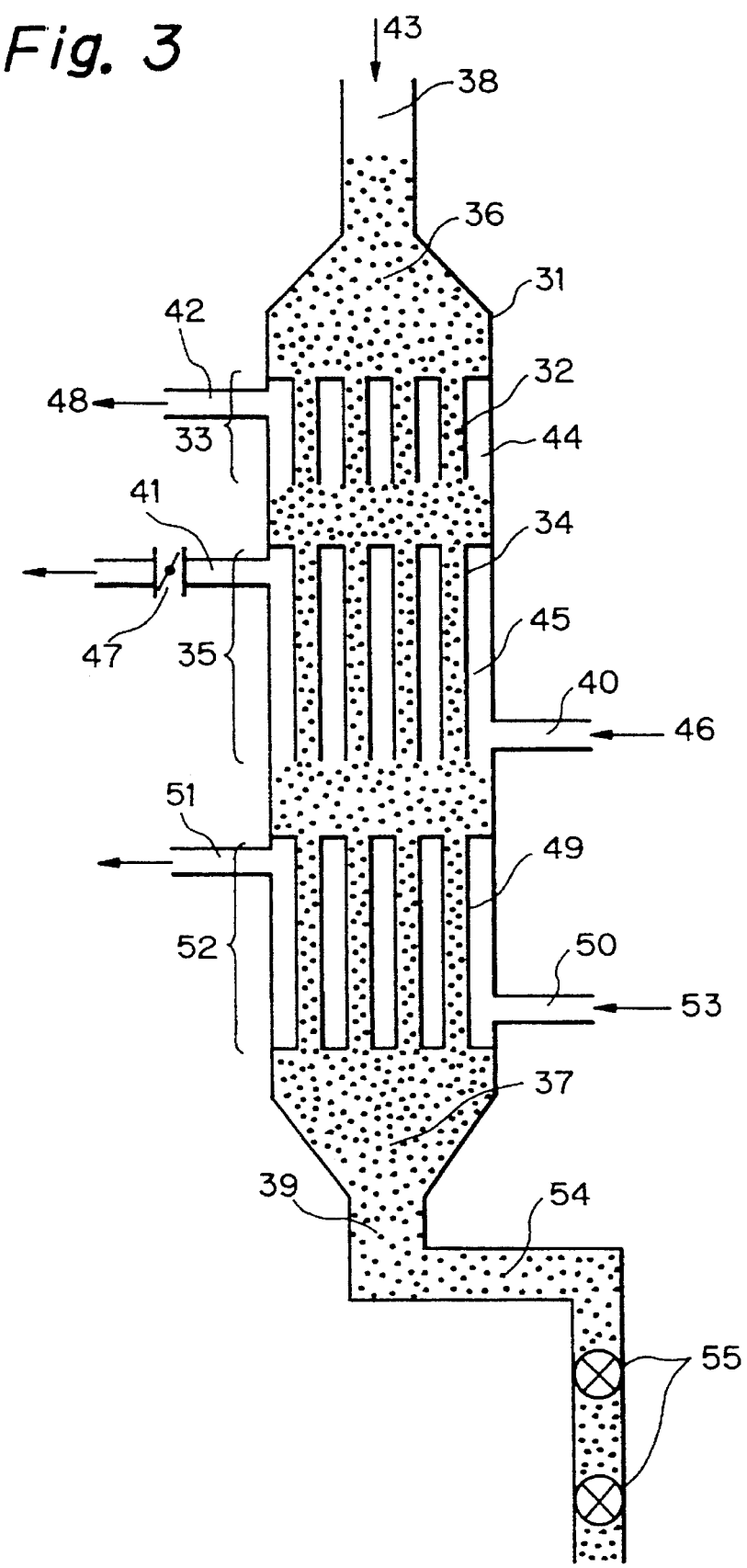
FIG. 3 is a schematic vertical sectional view showing a preferred embodiment of the activation retort used in the present invention.

The above embodiment is hereinafter described referring to FIG. 3 and FIG. 4. FIG. 3 is a schematic sectional view showing a preferred embodiment of the activation retort used in the present process. The activation retort of FIG. 3 has the same basic constitution as that of FIG. 2. Inside a retort 31 are provided a distribution section 33 containing a plurality of upper tubes 32 and a heating and activation section 35 containing a plurality of lower tubes 34. The space above the distribution section 33 forms a section 36 into which a formed coke is fed, and the space below the heating and activation section 35 forms a section 37 from which the formed activated coke is discharged. The outside of the tubes 32 and the outside of the tubes 34 are closed at the respective tops and form a gas passage 44 and a gas passage 45, respectively. The top of the retort is provided with a formed coke inlet 38 and the bottom of the retort is provided with a formed activated coke outlet 39. The side of the retort is provided with a heating and activation gas inlet 40, a heating gas outlet 41 from which the portion of the heating and activation gas used for heating is discharged, and an activation gas outlet 42 from which part of the heating and activation gas used for activation of formed coke in heating and activation section and containing combustible components (e.g. hydrogen) generated mainly in activation reaction is discharged.

In the above activation retort, a formed coke 43 fed from the formed coke inlet 38 is once retained in the section 36 into which the formed coke is fed. Then, it is distributed substantially uniformly, flows down inside the tubes 32 of the distribution section 33 and is retained on the heating and activation section. The distribution section 33 has a function of uniformly distributing the formed coke so that the formed coke can flow down uniformly in the activation retort. However, the most important function of the distribution section is to, by providing a space in the formed coke retained on the heating and activation section, make uniform the thickness of formed coke retained on the heating and activation section and thereby make uniform the flow of activation gas in tubes 34 and enable easy recovery of activation gas containing combustible components (e.g. hydrogen) generated in activation reaction. Since neither heat exchange nor reaction is expected in the tubes 32, the tubes 32, as compared with the tubes 34, may have a large diameter, a small length and a small number. The most serious problems when an embodiment such as above is used and a formed coke (flowing down) is contacted with an activation gas (rising up) in a plurality of tubes, are that if the layer thickness of formed coke retained on heating and activation section is not uniform or said thickness is large giving a large gas resistance, the flow of activation gas through tubes 34 is not smooth and the activation gas passes predominantly through tubes of small gas resistance, making impossible uniform activation of formed coke. In the present embodiment, by providing the distribution section 33, the layer thickness of formed coke retained on heating and activation section is made small and uniform so that the distance the gas flows through the formed coke retained on the heating and activation section can be shortened independently of locations, whereby the activation gas can flow through the tubes 34 uniformly.

Figure 4A:
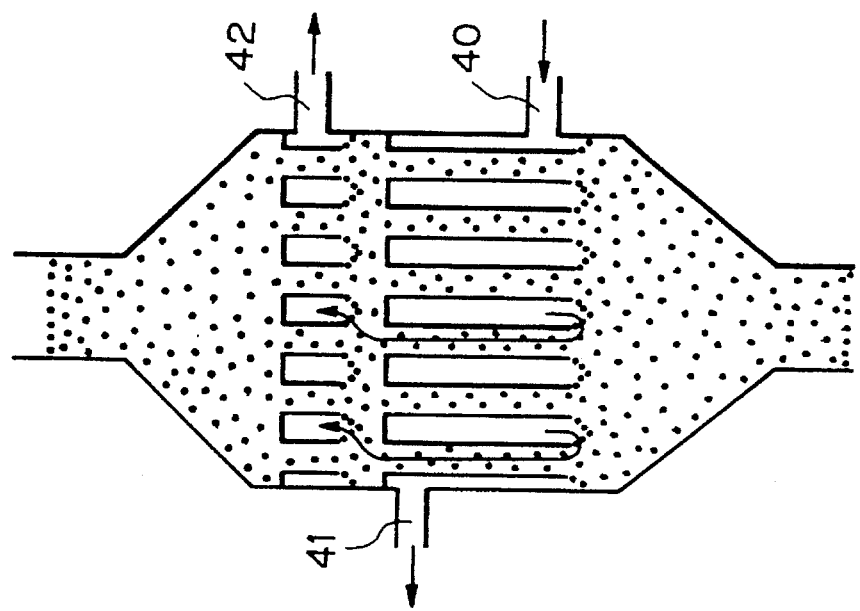
FIG. 4(a) is a schematic vertical sectional view showing the flow of an activation gas in an activation retort containing no distribution section.
Figure 4B:
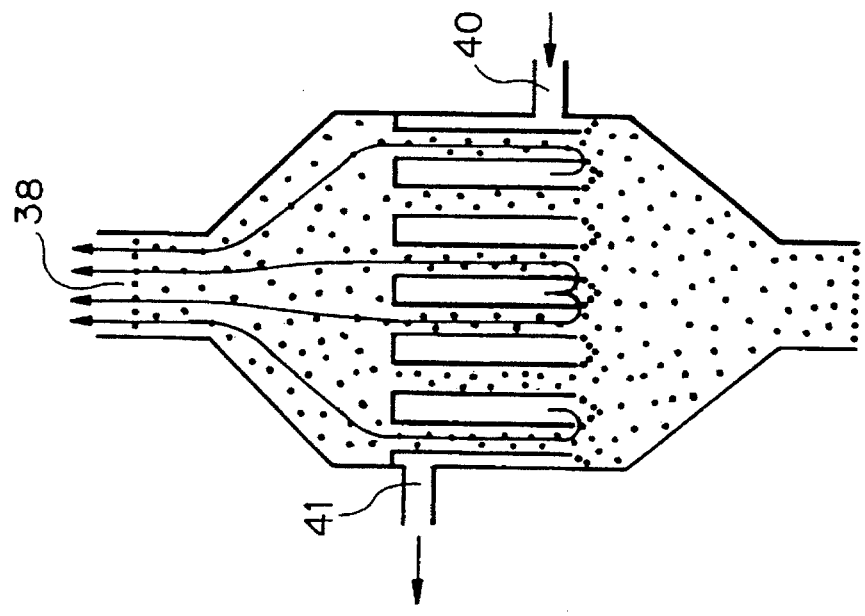
FIG. 4(b) is a schematic vertical sectional view showing the flow of an activation gas in an activation retort of the present invention containing a distribution section.

That is, in an apparatus as shown in FIG. 4(a) wherein no distribution section is provided and an activation gas is discharged from a formed coke inlet 38, an activation gas leaving each tube flows according to arrow-marked lines; therefore, the distance the gas flows through carbonaceous material layer differs depending upon the location of the tube through which the gas passes and the activation gas passes in larger amounts through tubes closer to the center of activation retort than through tubes distant from said center, making activation non-uniform. In contrast, in an activation retort of the present embodiment as shown in FIG. 4(b) wherein a distribution section is provided, an activation gas flows according to arrow-marked lines; therefore, the distance of the activation gas flows through formed coke layer is small and substantially constant, making uniform and smooth activation possible.

When the temperature of formed coke fed into distribution section is low and the heat amount for heating the formed coke is short, a gas inlet (not shown) may be provided at the side of the distribution section to feed an appropriate amount of air or the like to burn part of the formed coke or part of the combustible components generated mainly in activation reaction and heat the distribution section. However, such a gas inlet is not required ordinarily when the activation retort of the present embodiment is provided contiguously to a carbonization step, because a formed coke is fed into the distribution section at high temperatures of about 600°–900° C.

The formed coke leaving the tubes 32 is once retained on the top of the heating and activation section. Then, the formed coke flows down through the tubes 34 while being heated from outside and is heated by an activation gas rising inside the tubes 34, to 750°–1,000° C. (highest temperature), preferably 850°–950° C. and activated.

The activated formed coke of high temperature leaving the heating and activation section passes through the formed activated coke-discharging section 37 below the activation section and then may be discharged out of the retort from the formed activated coke outlet 39 via a formed activated coke discharger 54 (e.g. vibrating feeder) and a gas sealer 55 (e.g. rotary valve). Alternatively, the formed activated coke of high temperature leaving the heating and activation section may be discharged out of the retort, after being cooled in a cooling section 52 containing a plurality of vertical tubes and provided between the heating and activation section 35 and the discharge section 37, in which cooling section a cooling medium 53 is fed from a cooling medium inlet 50 and discharged from a cooling medium outlet 51.

A heating and activation gas 46 is fed into the retort from a heating and activation gas inlet 40. Part of the gas passes through a gas passage 45 outside the heating and activation section tubes 34, is used for heating of the formed coke inside the tubes 34, and is discharged from a heating gas outlet 41. The remainder of the heating and activation gas fed into the retort enters the tubes 34 from the bottom of the tubes 34 and rises inside the tubes 34 for contact with and activation of the formed coke flowing down. With the progress of activation, hydrogen and carbon monoxide are generated according to the following formula.

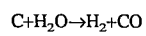

$$C+H_2O \rightarrow H_2+CO$$

In addition, the volatile matter remaining in formed coke decomposes during heating and activation depending upon the severity of carbonization, generating combustible components such as hydrogen, methane and the like.

The amount of activation gas fed into tubes 34 can be desirably controlled by controlling the amount of heating and activation gas fed into retort, or by providing a flow regulator 47 (e.g. damper) at the heating gas outlet 41 and thereby controlling the amount of heating gas discharged.

The activation gas leaving the tubes 34 and containing combustible components (e.g. hydrogen) generated in the activation reaction, heats the formed coke from outside the tubes 32 in the distribution section, and then is recovered from an activation gas outlet 42 as a combustible gas 48 containing 15–60% of combustible components. This combustible gas, containing hydrogen and carbon monoxide as combustible components in high concentrations, can be used as a fuel for carbonization or activation gas generation in the production process for formed activated coke.

The tubes 32 and 34 may be replaced by hollow cylinders having a donut-shaped section, wherein a heating gas is passed inside and outside the cylinder.

As described above, in the present process shown in FIG. 2 or FIG. 3, there is used, as the activation retort for subjecting a formed coke to steam activation to produce a formed activated coke, a vertical multi-tubular activation retort in place of the conventional rotary kiln or multi-stage bed retort; therefore, the amount of formed coke treated per m³ of activation retort can be increased to maximum about 200 kg/hr, as compared with the conventional level of about 40 kg/hr, and significant simplification of apparatus is possible. Further, by providing a distribution section above the heating and activation section, uniform and smooth contact between formed coke and activation gas is possible, whereby a formed activated coke of more uniform and better quality can be obtained easily. Furthermore, by separating the passages of heating gas and activation gas, the combustible components (e.g. hydrogen and carbon monoxide) generated mainly in the activation reaction can be recovered and reused as a fuel, significantly improving the heat efficiency of whole process.

The present invention is hereinafter described in more detail by way of Examples. In the Examples, desulfurization efficiency, denitrification efficiency and strength were measured by the following test methods.

Desulfurization Efficiency and Denitrification Efficiency

A tubular test apparatus of 50 mm in inside diameter was filled with 300 cc of a formed activated coke. Through the tube was passed a test gas composed of 1,000 ppm of $SO_2$, 200 ppm of NO, 5% of $O_2$, 10% of $H_2O$, 200 ppm of $NH_3$ and the remainder of $N_2$, at 130° C. at a space velocity of 400 $hr^{-1}$. The concentrations of $SO_2$ and NO in outlet gas were measured, from which the desulfurization efficiency and the denitrification efficiency were determined.

Strength 20 g of a sample of 6 mm or more in particle diameter was fed into the rotary drum of a tester for the Roga method described in JIS M 8801. The drum was then rotated by 1,000 rotations at 50 rpm. The contents were sifted through a 6 mm-sieve. The proportion (%) of the sample remaining on the sieve was taken as the strength of the sample.

EXAMPLE 1

A bituminous coal containing 34% of a volatile matter was ground so as to have an average particle diameter of 40 μm. The ground coal as starting material was passed through a carbonization retort of a type shown in FIG. 1 (the inside diameter of heating section=20 cm, the length=10 m) at a rate of 36 kg/hr for 5 seconds (residence time) using a gas [obtained by combustion of a coke oven gas (COG)] of 800° C. containing 5% of oxygen, to subject the coal to preliminary carbonization to obtain a semi-coke at a yield of 85%. The semi-coke contained about 25% of a volatile matter; the variation in volatile matter content was small (±2%); thus, the semi-coke was very uniform.

To 76 parts by weight of this semi-coke as primary material were added, as secondary materials, 12 parts by weight of a highly caking coal and 12 parts by weight of a soft pitch. Further, 20 parts by weight of water was added. The mixture was kneaded and controlled so as to have a Roga index of 20%, whereby a forming material was prepared. The forming material was formed into pellets of 10 mm in diameter and 10 mm in length, using a disc pelleter. The formed material was subjected to carbonization at 850° C. for 30 minutes using a rotary kiln to obtain a formed coke of 50 $m^2/g$ in specific surface area. The formed coke was subjected to an activation treatment using a vertical multi-tubular retort having a structure shown in FIG. 2. The residence times in the heating section, activation section and cooling section of the retort were 30 minutes, 30 minutes and 60 minutes, respectively; the temperature in the activation section was 900° C. The activation was conducted by feeding a gas obtained by COG combustion and having a steam content adjusted to 20%, at a space velocity of 600 $hr^{-1}$. It was presumed that 10% of the gas fed was used as an activation gas. Hence, the volume of the activation gas was calculated to be 250 times the volume of the formed coke fed. Air was fed to the cooling section so that the section was kept at 200° C. The formed activated coke obtained had a strength of 95.1% and a specific surface area of 200–215 $m^2/g$ and showed a desulfurization efficiency of 75% and a denitrification efficiency of 50% as measured according to the above-mentioned method; thus, the formed activated coke had excellent properties as a formed activated coke for simultaneous desulfurization and denitrification. The yield in activation step was 96.0% and the amount treated per $m^3$ of activation retort was about 150 kg/hr.

COMPARATIVE EXAMPLE 1

The same coal as used in Example 1 was ground so as to have an average particle diameter of 1,500 μm. The ground coal was subjected to carbonization at 450° C. for 10 minutes using a carbonization retort of fluidized bed type (a fluidized bed carbonization retort), to obtain a semi-coke at a yield of about 85%. The volatile matter content in semi-coke showed a large variation (22–29% with an average of 25%). The semi-coke was subjected to the same procedure as in Example 1 to obtain a formed activated coke. The specific surface area of the formed activated coke showed a large variation (120–170 $m^2/g$).

The above indicates that employment of the step for semi-coke production by preliminary carbonization according to the present invention, as compared with the conventional process, can give a semi-coke of uniform quality.

COMPARATIVE EXAMPLE 2

A formed coke obtained in the same manner as in Example 1 was activated at 900° C. for 30 minutes in a gas obtained by COG combustion and having a steam content adjusted to 20%, using an activation retort of multi-stage bed type [Herreshoff Furnace (trade name)], to obtain a formed activated coke having a strength of 95.0% and a specific surface area of 130–150 $m^2/g$. The formed activated coke was measured for desulfurization efficiency and denitrification efficiency by the above-mentioned methods. The desulfurization efficiency was 65% and the denitrification efficiency was 40%. Further, the yield in activation step was about 94% and the amount treated per $m^3$ of activation retort was about 40 kg/hr.

The above indicates that the activation step of the present invention is far superior to the conventional activation step in volume efficiency. The above also indicates that the formed activated coke obtained according to the present process, as compared with that according to the conventional process, shows a high desulfurization efficiency and a high nitrification efficiency, has a very large specific surface area, and is very useful as a formed activated coke for desulfurization and denitrification.

EXAMPLE 2

Starting from the same bituminous coal as in Example 1 and using the same procedure as in Example 1, there was obtained the same formed coke having a specific surface area of 50 $m^2/g$, as in Example 1.

The formed coke was subjected to an activation treatment using an activation retort shown in FIG. 3 (this retort is a modification of the activation retort of FIG. 2 and had the same structure as that of FIG. 2 except that the differences mentioned below). Activation was conducted by controlling the residence times of formed coke in distribution section and heating and activation section to 30 minutes and 60 minutes, respectively, and the highest temperature in heating and activation section to 900° C. and by feeding a gas of 950° C. obtained by COG combustion and having a steam content adjusted to 30%, at a space velocity of 1,000 $hr^{-1}$ (10% of the gas was used as an activation gas and the volume of the activation gas was 250 times that of the formed coke). The formed activated coke obtained had a strength of 95.0%, a desulfurization efficiency of 77%, a denitrification efficiency of 51% and a specific surface area of 210 $m^2/g$; thus, the formed activated coke had been activated sufficiently and had a good uniform quality.

A gas of 800° C. containing 21% of hydrogen and 10% of carbon monoxide was continuously recovered from an activation gas outlet 42 at a rate of 0.2 $m^3$/min.

The yield in activation step was 96% and the amount treated per $m^3$ of activation retort was about 150 kg/hr.

COMPARATIVE EXAMPLE 3

The activation gas generated in the activation treatment of Comparative Example 2 was collected and analyzed. It contained about 10% of hydrogen and carbon monoxide.

What is claimed is

1. An improved process for producing a formed activated coke, comprising subjecting a coal to preliminary carbonization to obtain a semi-coke having a volatile matter content of 10 to 30 percent and a specific surface area of 10 to 300 m²/g, adding to the semi-coke, as primary material, a secondary material for control of caking properties to prepare a forming material, forming the forming material to prepare a formed material, subjecting the formed material to carbonization to obtain a formed coke having a specific surface area of 10 to 60 m²/g, and activating the formed coke to obtain a formed activated coke having a specific surface area of 100 to 300 m²/g, wherein:

(a) the step of subjecting the coal to preliminary carbonization to obtain the semi-coke comprises entraining the coal in a hot gas stream of 200° to 1,000° C. containing 1 to 21 percent of oxygen and passing the entrained coal and stream through a tubular or cylindrical carbonization retort kept at 200° to 1,000° C., said coal having an average particle diameter of 10 to 1,000 μm, said coal being kept moving at a speed such that the speed of the entrained coal is in a range of 2 to 30 m/sec and residence time in said retort is in a range of 1 to 10 seconds, and/or (b) the step of activating the formed coke, comprises transferring the formed coke from the top to the bottom of a vertical, multi-tubular, indirect heating retort through a heating section for heating the formed coke to 600° to 1,000° C. and an activation section provided below or beneath the heating section, for contacting and activating the formed coke with an activation gas at 750° to 1,000° C., said retort comprising a plurality of vertical tubes inside of and in which the heating section and the activation section are connected to each other by having common vertical tubes and in which the formed coke flows down inside of the tubes while the activation gas flows up inside of the tubes and a heating gas to heat the heating section flows up through a space defined by the retort wall and the tubes, said space outside of the tubes being closed at the top and having an opening at the bottom, said heating gas and the activation gas being introduced as a single gas through an inlet located at the bottom of the space, said single gas being separated into the heating gas and the activation gas at the opening of said space at the bottom thereof, in which part of the introduced gas flowing up through the space becomes the heating gas which is discharged from an outlet located at the top of the space and the remainder of the introduced gas flows into the inside of the tubes through the opening at the bottom of the space and rising inside of the tubes and becomes the activation gas, controlling the ratio of the heating gas to the activation gas by using a gas flow controller provided at the heating gas outlet, whereby the single gas is separated into the heating gas and the activation gas and the heating gas is not in contact with the formed coke while the activation gas makes contact with the formed coke and can be recovered at the top of the retort as a reusable fuel.

2. An improved process for producing a formed activated coke, comprising subjecting a coal to preliminary carbonization to obtain a semi-coke having a volatile matter content of 10 to 30 percent and a specific surface area of 10 to 300 m²/g adding to the semi-coke, as a primary material, a secondary material for control of caking properties to prepare a forming material, forming the forming material to prepare a formed material, subjecting the formed material to carbonization to obtain a formed coke having a specific area of 10 to 60 m²/g, and activating the formed coke to obtain a formed activated coke having a specific surface area of 100 to 300 m²/g, wherein the step of subjecting the coal to the preliminary carbonization to obtain the semi-coke comprises entraining the coal in a hot gas stream of 200° to 1,000° C. containing 1 to 21 percent of oxygen and passing the entrained coal and stream through a tubular or cylindrical carbonization retort kept at 200° to 1,000° C., said coal having an average particle diameter of 10 to 1,000 μm, said coal being kept moving at a speed such that the speed of the entrained coal is in a range of 2 to 30 m/sec and residence time in said retort is in a range of 1 to 10 seconds.

3. The improved process for producing a formed activated coke, according to claim 2, wherein the coal has an average particle diameter of 50 to 200 μm.

4. The improved process for producing a formed activated coke, according to claim 2, wherein in the coal has an average particle diameter of 50 to 200 μm.

5. An improved process for producing a formed activated coke, comprising subjecting a coal to preliminary carbonization to obtain a semi-coke having a volatile matter content of 10 to 30 percent and a specific surface area of 10 to 300 m²/g, adding to the semi-coke, as primary material, a secondary material for control of caking properties to prepare a forming material, forming the forming material to prepare a formed material, subjecting the formed material to carbonization to obtain a formed coke having a specific surface area of 10 to 60 m²/g, and activating the formed coke to obtain a formed activated coke having a specific surface area of 100 to 300 m²/g, wherein the step of activating the formed coke comprises transferring the formed coke from the top to the bottom of a vertical, multi-tubular, indirect heat retort through a heating section for heating the formed coke to 600° to 1,000° C. and an activation section provided below or beneath the heating section, for contacting and activating the formed coke with an activation gas at 750° to 1,000° C., said retort comprising a plurality of vertical tubes inside of and in which the heating section and the activation section are connected to each other by having common vertical tubes and in which the formed coke flows down inside of the tubes while the activation gas flows up inside of the tubes and a heating gas to heat the heating section flows up through a space defined by the retort wall and the tubes, said space being closed at the top and having an opening at the bottom, said heating gas and the activation gas being introduced as a single gas through an inlet located at the bottom of the space, said single gas being separated into the heating gas and the activation gas at the opening of said space at the bottom thereof, in which part of the introduced gas flowing up through the space becomes the heating gas which is discharged from an outlet located at the top of the space and the remainder of the introduced gas flows into the inside of the tubes through the opening at the bottom of the space and rising inside of the tubes and becomes the activation gas, controlling the ratio of the heating gas to the activation gas by using a gas flow controller provided at the heating gas outlet, whereby the single gas is separated into the heating gas and the activation gas and the heating gas is not in contact with the formed coke while the activation gas makes contact with the formed coke and can be recovered at the top of the retort as a reusable fuel.

6. The improved process for producing a formed activated coke, according to claim 5, wherein the vertical multi-tubular retort further comprises an indirect cooling section containing three or more vertical tubes and said cooling section is provided below the activation section, for cooling the formed activated coke to about 200° C.

7. The improved process for producing a formed activated coke, according to claim 6, wherein the vertical multi-tubular retort further comprises a distribution section containing three or more vertical tubes and provided above the heating section and a second space defined by the retort wall and said tubes of the distribution section, the second space outside of the tubes being closed at the top and open at the bottom, whereby the formed coke is distributed uniformly into each of the heating section tubes and any activation gas at the top of said second space is recovered through an outlet provided at the top of said second space.

8. The improved process for producing a formed activated coke, according to claim 5, wherein the vertical multi-tubular retort further comprises a distribution section containing three or more vertical tubes and provided above the heating section and a second space which is formed by the retort wall and said tubes of the distribution section, the second space outside of the tubes is closed at the top and open at the bottom, whereby the formed coke is distributed uniformly into each of the heating section tubes and any activation gas trapped at the top of said space is recovered through an outlet provided at the top of said space.

* * * * *